United States Patent [19]
Bhamidipati et al.

[11] Patent Number: 6,112,295
[45] Date of Patent: Aug. 29, 2000

[54] HIGH FREQUENCY PIPELINE DECOUPLING QUEUE WITH NON-OVERLAPPING READ AND WRITE SIGNALS WITHIN A SINGLE CLOCK CYCLE

[75] Inventors: Sriram Bhamidipati; Kushagra V. Vaid, both of Sunnyvale, Calif.

[73] Assignee: Intel Corporation, Santa Clara, Calif.

[21] Appl. No.: 09/160,364

[22] Filed: Sep. 24, 1998

[51] Int. Cl.$^7$ ................................................. G06F 13/14
[52] U.S. Cl. ........................... 712/219; 711/110; 711/167
[58] Field of Search .................................. 711/109, 110, 711/167; 712/23, 219

[56] References Cited

U.S. PATENT DOCUMENTS

| | | | |
|---|---|---|---|
| 4,058,773 | 11/1977 | Clark et al. | 377/66 |
| 5,325,495 | 6/1994 | McLellan | 712/219 |
| 5,587,953 | 12/1996 | Chung | 365/220 |
| 5,918,034 | 6/1999 | Petolino, Jr. | 712/218 |
| 5,956,748 | 9/1999 | New | 711/149 |
| 5,961,615 | 10/1999 | Zaidi et al. | 710/54 |

OTHER PUBLICATIONS

Harris, David, and Horowitz, Mark A. Skew–Tolerant Domino Circuits. IEEE Journal of Solid–State Circuits, vol. 32. No. 11. pp. 1702–1711. Nov. 1997.

Weste, Neil H.E., and Eshraghian, Kamran. Principles of CMOS VLSI Design. A Systems Perspective; Second Edition. pp. 579–582 and pp. 651–654.

*Primary Examiner*—Kenneth S. Kim
*Attorney, Agent, or Firm*—Gene Su

[57] ABSTRACT

A method and apparatus for expediting the processing of a plurality of instructions in a processor is disclosed. In one embodiment, said processor has a plurality of pipeline units to process a plurality of instructions. Each of said pipeline units has a plurality of pipe stages. Further, a decoupling queue is provided to decouple at least one of said pipe stages from another, wherein said decoupling generates non-overlapping read and write signals to support corresponding read and write operations within a single clock cycle of said processor.

27 Claims, 9 Drawing Sheets

| CLOCK CYCLES/ INSTRUCTIONS | CYCLE 1 | CYCLE 2 | CYCLE 3 | CYCLE 4 | CYCLE 5 | CYCLE 6 | CYCLE 7 |
|---|---|---|---|---|---|---|---|
| INSTR. $i$ | F | D | A | X | | | |
| INSTR. $i+1$ | | F | D | A | X | | |
| INSTR. $i+2$ | | | F | D | A | X | |
| INSTR. $i+3$ | | | | F | D | A | X |

HIGH FREQUENCY PIPELINE DECOUPLING QUEUE WITH NON-OVERLAPPING READ AND WRITE SIGNALS WITHIN A SINGLE CLOCK CYCLE

FIELD OF THE INVENTION

This invention relates to a processor generally, and specifically to performance enhancement of the processor's pipelines.

BACKGROUND OF THE INVENTION

Processor designers have always attempted to reduce the amount of time a processor takes to execute a program. One technique for increasing a processor's performance is by overlapping the steps involved in executing multiple instructions. This technique is known as pipelining. Each step in the pipeline, or a pipe stage, completes a part of an instruction. The pipe stages are connected one to the next to form a pipe, where instructions enter at one end, are processed through the stages, and exit at the other end. Because pipelining exploits parallelism among the instructions in a sequential instruction stream, it yields a reduction in the average execution time per instruction.

Since instruction execution proceeds at different rates in various pipe stages, in order to ensure the optimal performance of a pipeline, one method involves inserting queues in the pipeline to decouple these pipe stages. For example, when a queue is inserted between a fetch stage and a decode stage of a pipeline, a processor can retrieve the instructions during the fetch stage and store them in the inserted queue. Instead of waiting for the output of the fetch stage, the processor can obtain instructions directly from the queue and proceed with its decode stage. As a result, the execution of the fetch stage and the decode stage have been decoupled. In other words, the two stages can carry our their own tasks independently.

Although the described decoupling queue mechanism enhances the performance of a pipeline, its limitations still may hamper continued design efforts in speeding up processors. As a processor further splits up its pipe stages and increases its clock speed, the duration of the decoupling queue's setup time and its delay to perform either a read or a write operation can become prohibitively lengthy in view of a diminishing clock cycle. When such overhead equals to the processor clock cycle, no further pipelining is useful in enhancing a processor's performance.

As has been demonstrated, an improved method and apparatus is needed to meet the aggressive timing goals and to design a processor at a target frequency without impacting its performance.

SUMMARY OF THE INVENTION

A method and apparatus for expediting the processing of a plurality of instructions in a processor is disclosed. In one embodiment, the processor has a plurality of pipeline units to process a plurality of instructions. Each of the pipeline units has a plurality of pipe stages. Further, a decoupling queue is provided to decouple at least one of the mentioned pipe stages from another, wherein the a decoupling queue generates non-overlapping read and write signals to support corresponding read and write operations within a single clock cycle of the processor.

BRIEF DESCRIPTION OF THE DRAWINGS

The present invention is illustrated by way of example and is not limited by the figures of the accompanying drawings, in which like references indicate similar elements, and in which:

FIG. 2 illustrates the sequence for processing instructions according to the pipeline in FIG. 1.

FIG. 8a illustrates an example where the write pointer and the read pointer point to the same entry in the present invention's data storage unit.

FIG. 8b illustrates an example where the read pointer has wrapped around and WR mode is activated in the present invention's data storage unit.

DETAILED DESCRIPTION

A method and apparatus for expediting the processing of a plurality of instructions in a processor is described. In the following description, numerous specific details are set forth such as control logic unit, data storage unit and timing generation unit, etc. in order to provide a thorough understanding of the present invention. However, it will be apparent to one of ordinary skill in the art that the invention may be practiced without these particular details. In other instances, well known elements and theories such as processor design, registry file, pipeline, setup time, etc. have not been discussed in special details in order to avoid unnecessarily obscuring the present invention.

Figure 1:
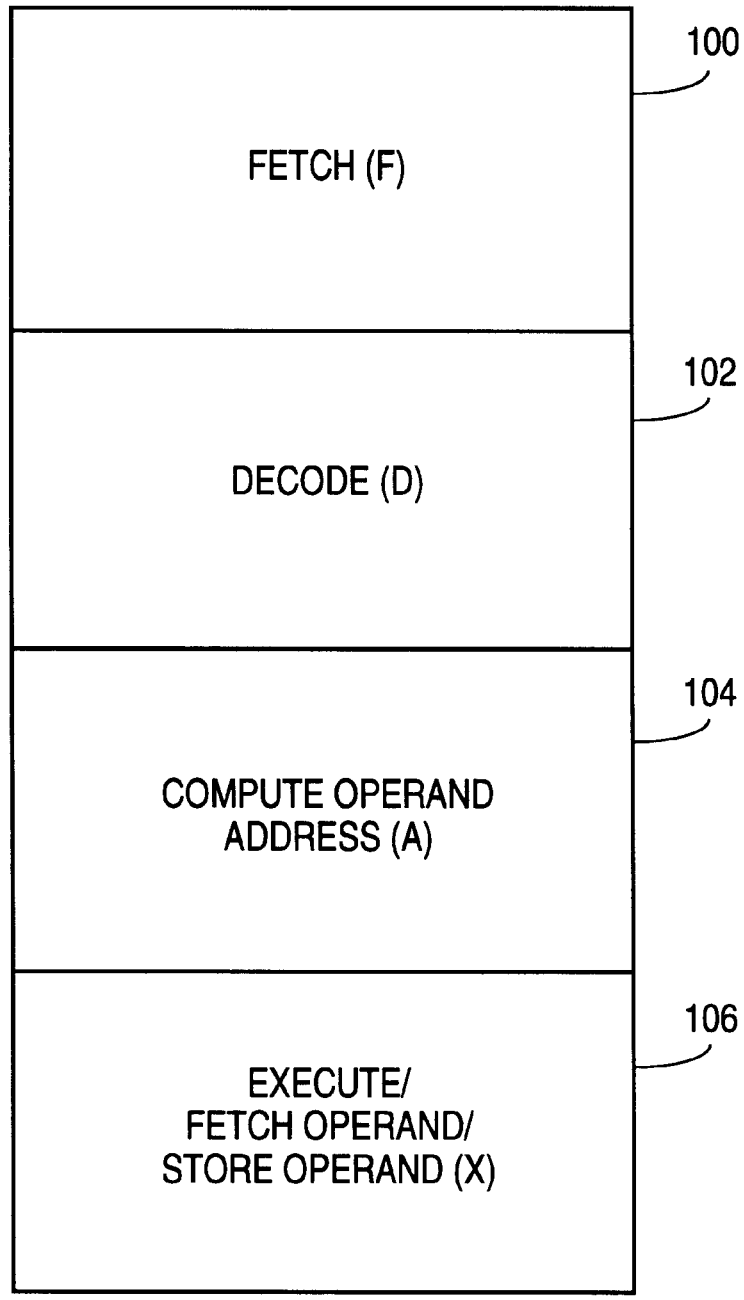
FIG. 1 illustrates a conventional pipeline for processing instructions.

FIG. 1 illustrates a conventional pipeline for processing instructions. The processing of such instructions consists of four stages: instruction fetch 100 (referred to as F), instruction decode 102 (referred to as D), operand address computation 104 (referred to as A), and execution/operand fetch/operand store 106 (referred to X). Each of these steps become a pipe stage and results in the execution pattern shown in FIG. 2. While each instruction still takes four clock cycles, during each clock cycle the hardware is executing some part of four different instructions. Although pipelining does not reduce the execution time of an individual instruction, it increases the number of instructions completed per unit of time.

Figure 3:
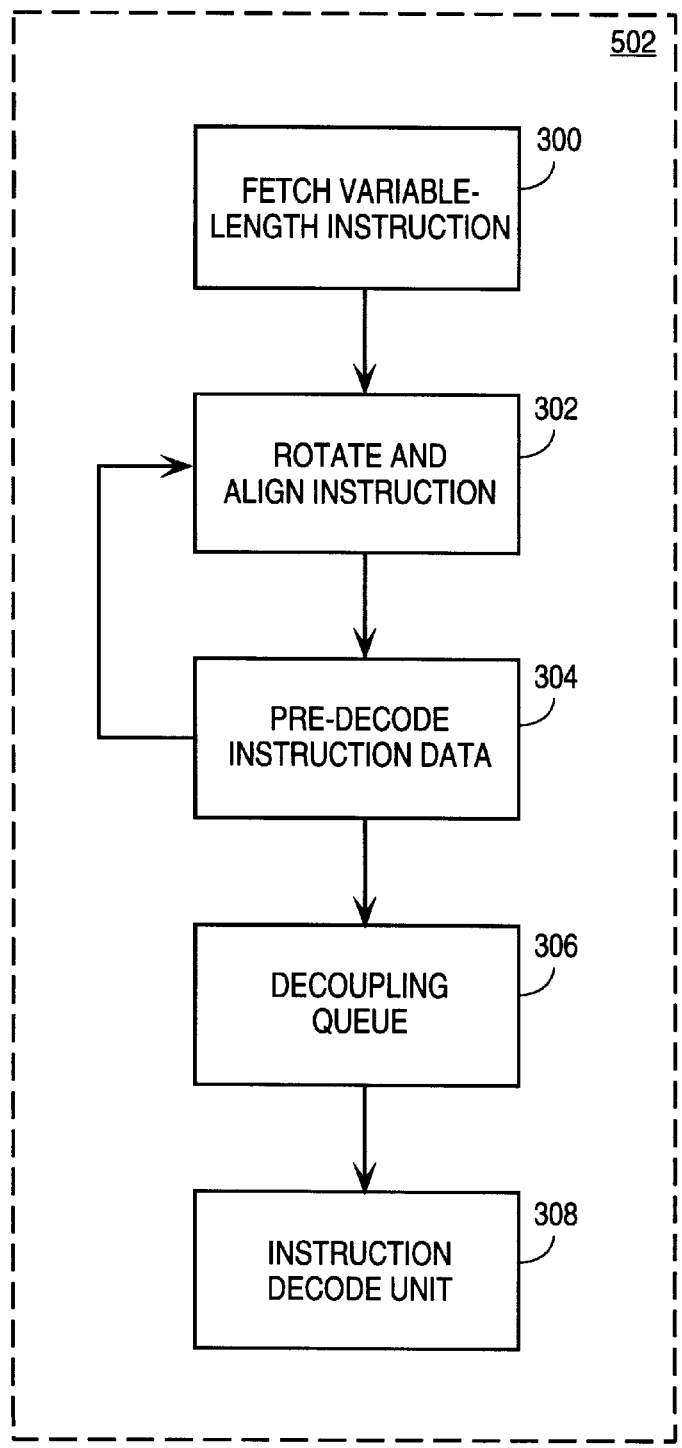
FIG. 3 illustrates a block diagram of one specific application of the present invention.
Figure 4:
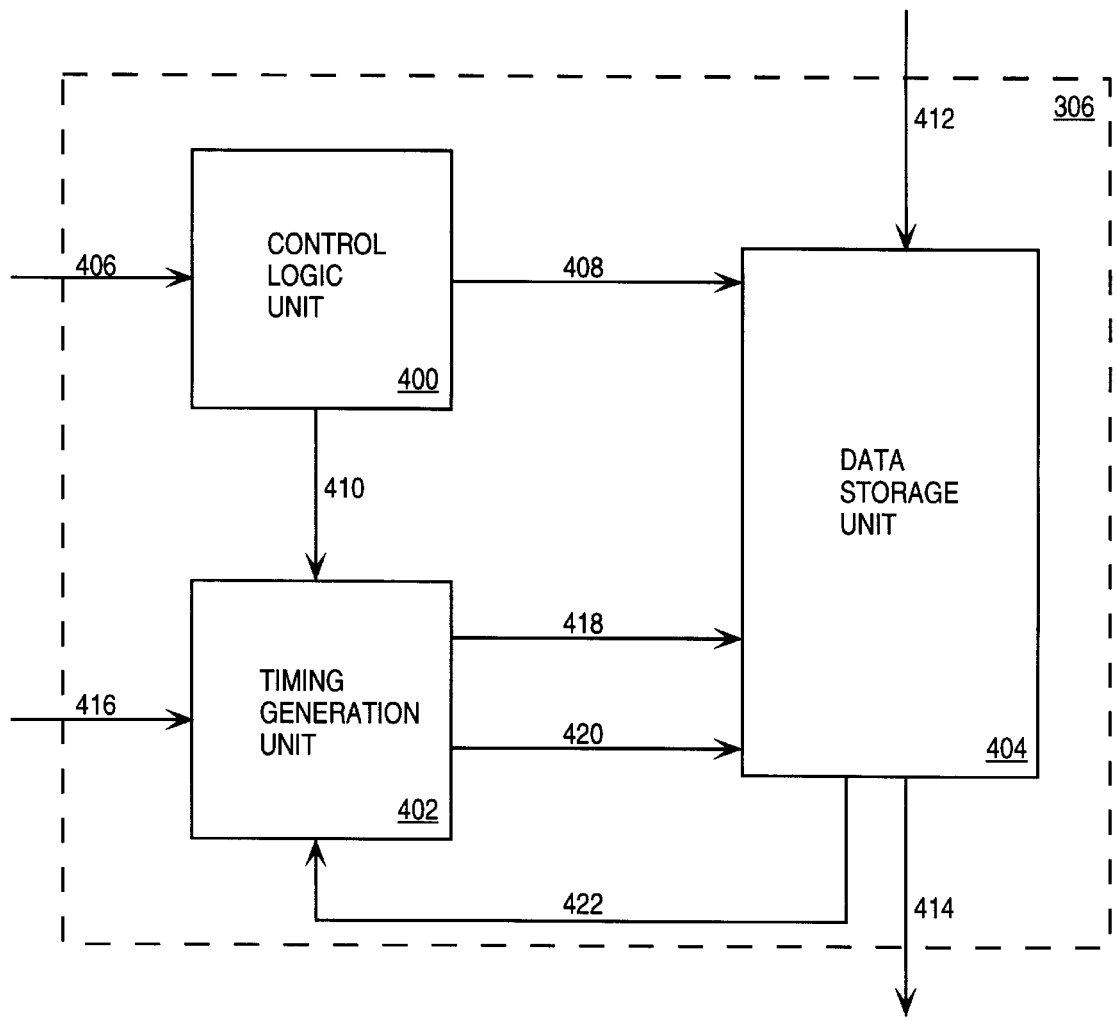
FIG. 4 illustrates a block diagram of one embodiment of the present invention.
Figure 5:
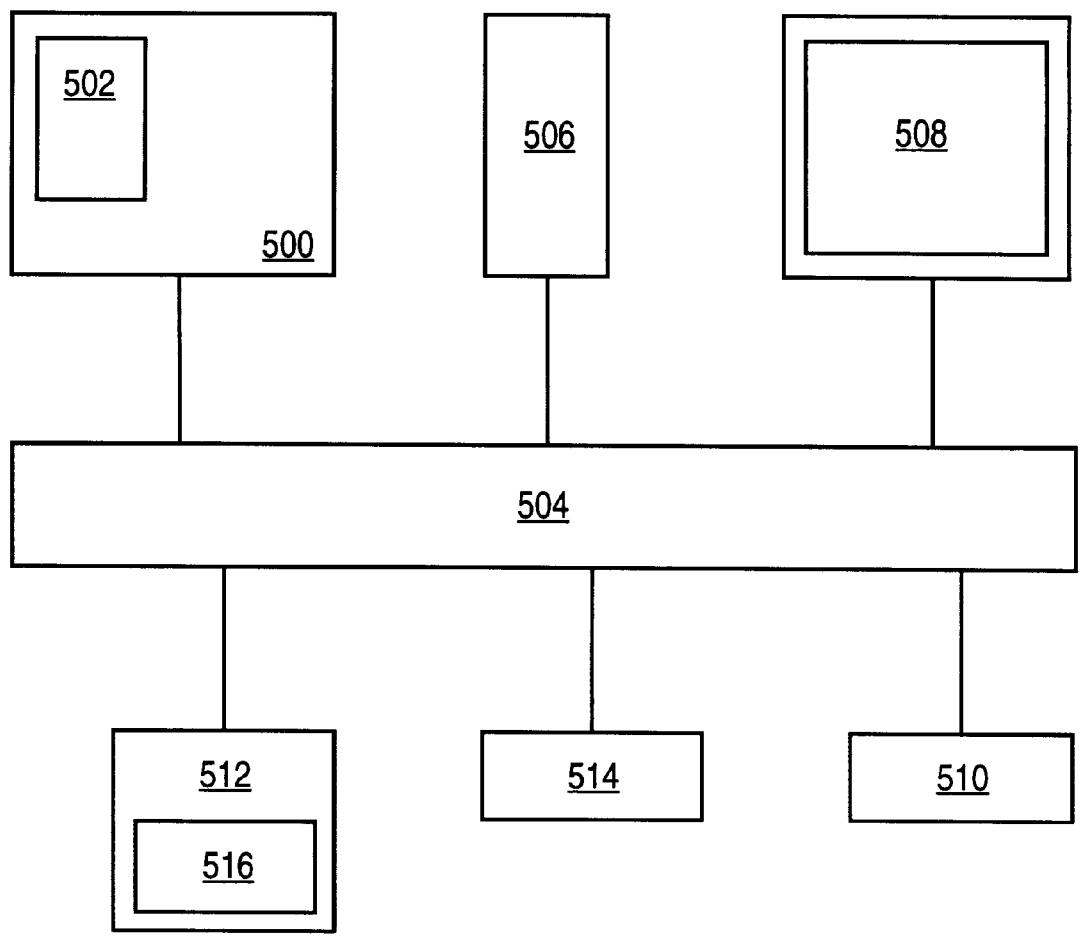
FIG. 5 illustrates a general purpose computer system architecture.

Having briefly discussed the conventional pipeline principles, FIG. 3 illustrates a block diagram of one specific application of the present invention. It should be apparent to one ordinarily skilled in the art to apply the block diagram to other pipe stages in a processor. In addition, FIG. 4 illustrates a block diagram of one embodiment of the present invention. The block diagram can be implemented in various types of processors within different general purpose computer systems. One such computer system is illustrated in FIG. 5.

This computer system architecture comprises a processor 500 with a pipeline unit 502 containing the present invention for processing audio, video and data information, coupled with bus element 504 for communicating information, a random access memory 506 coupled with said bus element 504 for storing static information and instructions for said processor 500, a data storage device 512 such as a magnetic disk and disk drive coupled with said bus element 504 for storing an operating system 516, information and instructions, a readable medium 514 such as a floppy disk or a CD coupled with said bus element 504 for retrieving information and instructions for said processor 500, a display device 508 coupled to said bus element 504 for displaying information to the computer user and an alphanumeric or other conventional input device 510 coupled to said bus element 504 for communicating information and command selections to said processor 500.

Operation of the Present Invention

The invention at hand is a method and apparatus for expediting the processing of a plurality of instructions in a processor. Specifically, the present invention not only decouples one pipe stage in a processor's pipeline unit from another, it also supports both read and write operation from the same data storage location within the processor's single clock cycle. Further, the present invention generates its own non-overlapping read and write signal to trigger the appropriate read and write operations. These read and write signals remain active for a minimum duration to complete the desired operations and to meet a subsequent logic stage's setup time requirement. The invention also includes logic to determine the most efficient sequence to execute the read and write operations.

One application of the invention is a general purpose computer system operating on particular components as illustrated in FIG. 3. Specifically, selected pipe stages in pipeline unit 502 in conjunction with the present invention are used to demonstrate the functionality of decoupling queue 306. After operating system 516 on data storage device 512 loads instructions from either data storage device 512 or readable medium 514, it also sets up the necessary environment for the instructions' execution. The instructions for processor 500 are typically stored in random access memory 506.

Block 300 retrieves variable-length instructions from memory. Then block 302 rotates and aligns this retrieved information by the number of bytes derived from block 304's pre-decoding. Blocks 300, 302 and 304 can together be considered as pipe stage F 100 as shown in FIG. 1. Since decoupling queue 306 stores outputs from block 304, instruction decode unit 308, or pipe stage D 102 in FIG. 1, does not need to stall for the completion of pipe stage F 100. Instead, instruction decode unit 308 can proceed by processing stored instructions from decoupling queue 306. In other words, operations of pipe stage F 100 and pipe stage D 102 have been decoupled by use of decoupling queue 306.

It should be emphasized that although specific pipe stages are used to describe the present invention, the invention may be incorporated in other pipe stages without exceeding its scope. For example, decoupling queue 306 may be inserted between pipe stage D 102 and pipe stage A 104. Moreover, it should be obvious to one of ordinary skill in the art to apply the present invention to many more pipe stages than the four illustrated in FIG. 1, or to multiple pipelines within a processor or to multiple processors within an illustrative computer system in FIG. 5 without departing from the scope of the present invention.

The mechanism of decoupling queue 306 in FIG. 3 is further elaborated in FIG. 4. Specifically, decoupling queue 306 includes control logic unit 400, timing generation unit 402 and data storage unit 404. In one embodiment of the present invention, data storage unit 404 is a register file.

Figure 6:
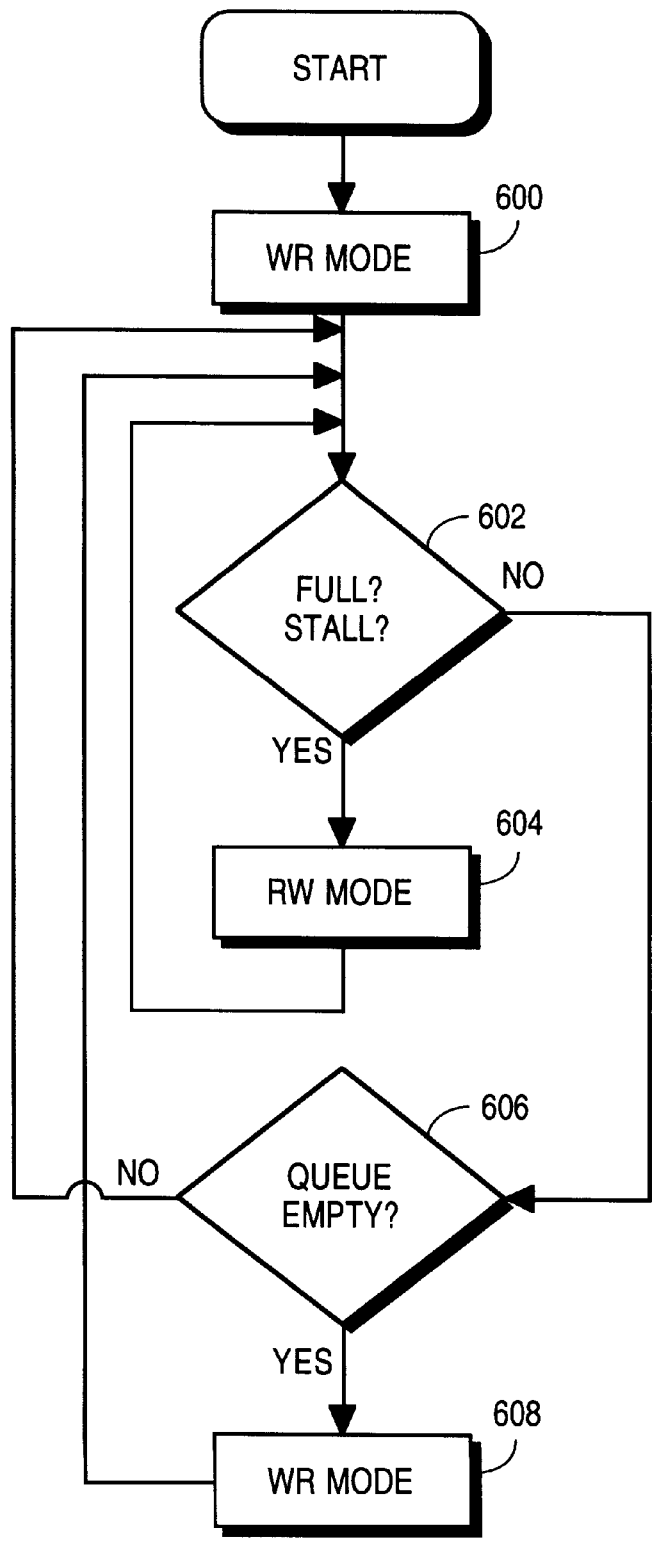
FIG. 6 illustrates a flow chart for one embodiment of the present invention's control logic unit.

FIG. 4 and FIG. 6 illustrate one embodiment of control logic unit 400. According to its external input 406 and its internal pointer calculations, control logic unit 400 generates a control signal 410 to indicate the desired read and write mode for decoupling queue 306. Specifically, control logic unit 400 begins by setting timing generation unit 402 to write-operation-first-read-operation-later (referred to as WR) mode in step 600. As control logic unit 400 calculates the location in data storage unit 404 to write incoming data 412 into and to read outgoing data 414 from, control logic unit 400 maintains an independent write pointer and a read pointer to track the calculated locations.

Based on the values of these two pointers or the value of its external input 406, control logic unit 400 determines whether data storage unit 404 has capacity to continue receiving incoming data 412 in step 602. When the write pointer and the read pointer indicate a full data storage unit 404, or when external input 406 indicates a stall in the previous pipe stage, control logic unit 400 issues a control signal 410 to timing generation unit 402 for switching to read-operation-first-write-operation-later (referred to as RW) mode in step 604. Otherwise, WR mode continues.

In a similar fashion, based on the write pointer and read pointer values, control logic unit 400 verifies whether the read operations on outgoing data 414 have depleted data storage unit 404 in step 606. Depending on the outcome of step 606 and the present state of control logic unit 400, either RW mode changes back to WR mode, or the state, RW mode or WR mode, remains unaltered.

Figure 7:
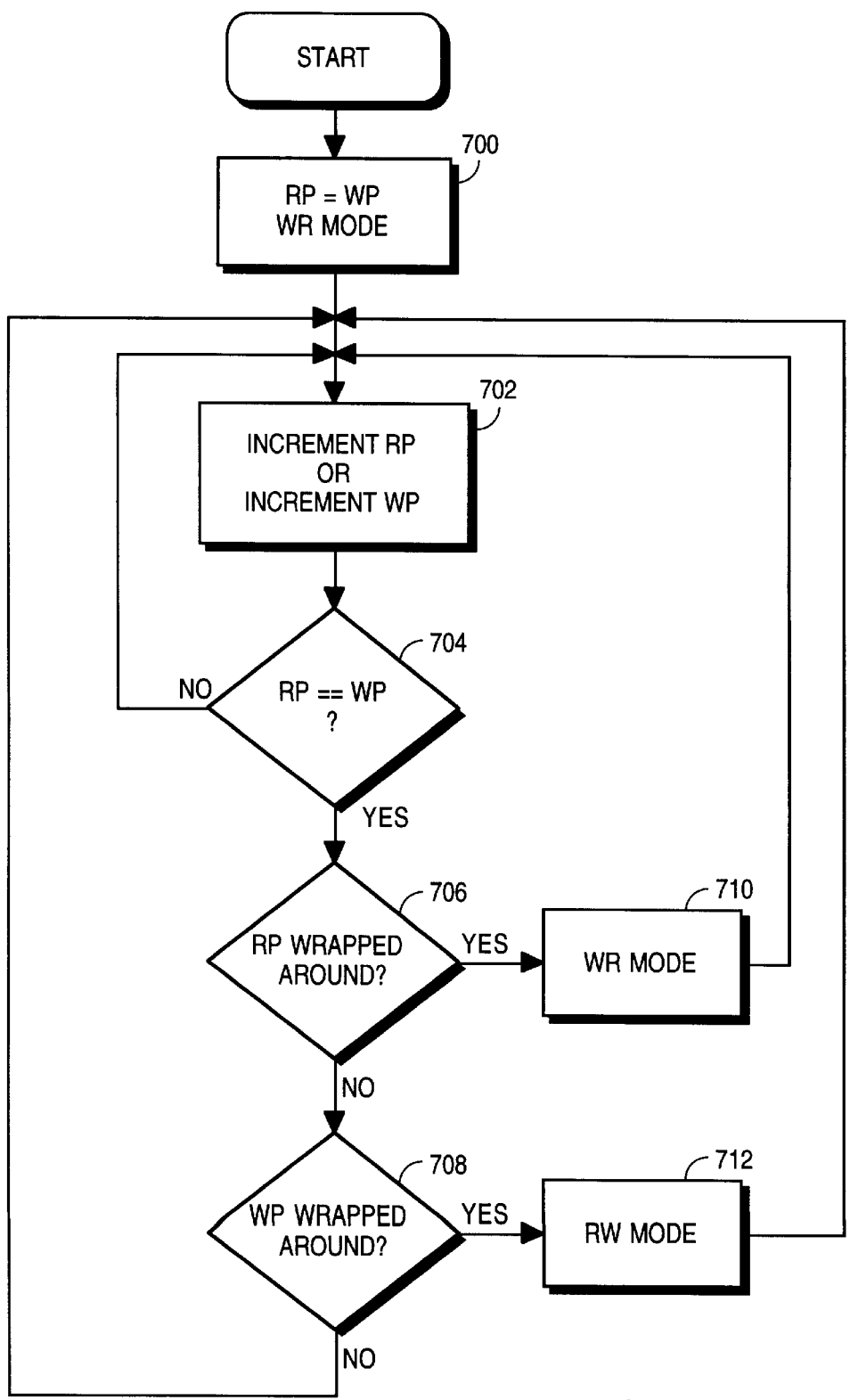
FIG. 7 illustrates a flow chart for the write pointer and read pointer manipulation of the present invention's control logic unit.
Figure 8C:
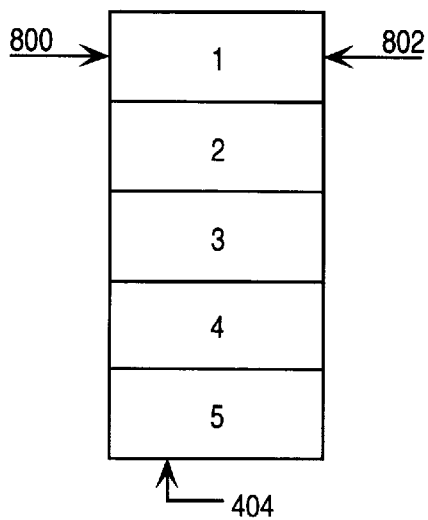
FIG. 8c illustrates an example where the write pointer has wrapped around and RW mode is activated in the present invention's data storage unit.
Figure 8C:
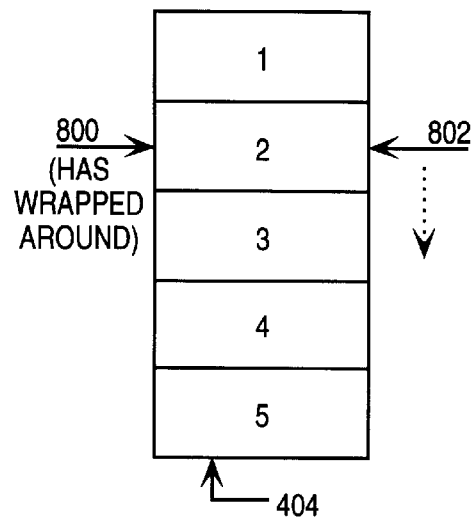
Figure 8C:
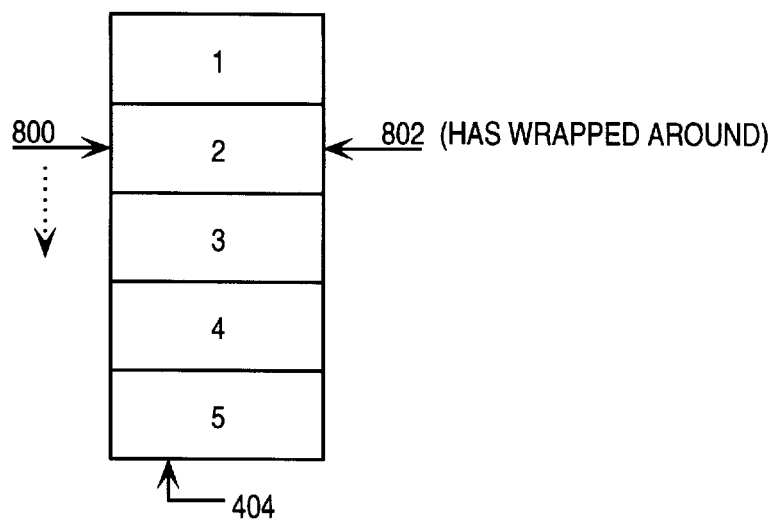

In conjunction with examples shown in FIGS. 8a, 8b and 8c and the block diagram shown in FIG. 4, FIG. 7 further illustrates the discussed read pointer and write pointer operations. In step 700, using data storage unit 404 with five entries as shown in FIG. 8a, the read pointer 800 (referred to as RP 800) and the write pointer 802 (referred to as WP 802) initially point to the same first entry, and control logic unit 400 begins with WR mode. As incoming data 412 enters data storage unit 404, WP 802 is incremented in step 702. Similarly, as outgoing data 414 leaves data storage unit 404, RP 800 is also incremented in step 702. When either pointer reaches the end of data storage 404, or entry 5, the pointer is wrapped around or begins from entry 1 again.

FIG. 8b demonstrates one possible scenario where RP 800 has wrapped around and data storage unit 404 is empty. More specifically, when WP 802 has advanced from entry 1 to 5 and has wrapped around to entry 2, and when RP 800 has also advanced in the similar manner, all incoming data 412 already written into data storage unit 404 have been read out through outgoing data 414. When RP 800 and WP 802 point to the same entry 2 in step 704, and RP 800 is verified to have wrapped around in step 706, WR mode continues in step 710. In other words, write operations must take place before any further read operations can occur. As the write operation executes, WP 802 advances to entry 3 while RP 800 remains at entry 2.

On the other hand, FIG. 8c offers an alternative scenario where data storage unit 404 is full. Analogous to the previous discussions, when RP 800 and WP 802 point to the same entry in step 704, and WP 802 is verified to have wrapped around in step 708, WR mode is changed to RW mode in step 712. More particularly, read operations must occur prior to any subsequent write operations, because data storage unit 404 cannot accept any additional incoming data 412. As the read operation executes, RP 800 is incremented to entry 3 while WP 802 remains at entry 2.

Although details in one embodiment of the present invention are used to describe a particular mode switching mechanism and a control logic unit 400's operations, it will be apparent to one of ordinary skill in the art to use other methods to achieve the same goals without departing from the scope of the invention. For example, the mode switching intelligence can be part of data storage unit 404. Further, It should be contemplated that the logic steps illustrated in FIGS. 6 and 7 can be arranged in different orders and yet still yield the same results. For instance, step 606 and step 602 in FIG. 6 or step 706 and step 708 in FIG. 7 may interchange with some minor modifications without affecting the outcome.

Figure 9:
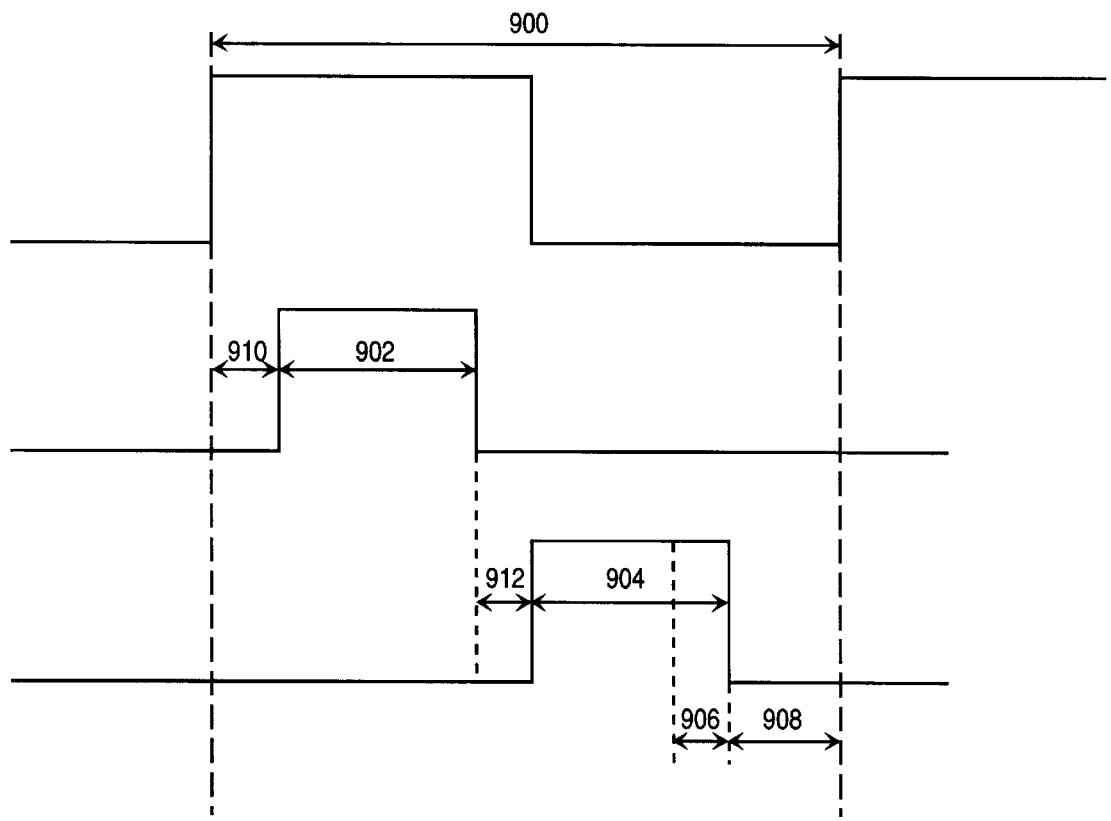
FIG. 9 illustrates a timing diagram for generating a write signal and a read signal within a processor clock cycle.

After having described the interactions among various components in decoupling queue 306, FIG. 4 in conjunction with FIG. 9 illustrate the operations of timing generation unit 402. According to control signal 410 from control logic unit 400, timing generation unit 402 generates a corresponding signal to data storage unit 404 to initiate data storage unit 404's write and read operations. Specifically, when control signal 410 indicates WR mode, processor clock 416's rising edge triggers a write signal 418. Conversely, if control signal 410 indicates RW mode, processor clock 416's rising edge triggers a read signal 420.

Within duration 900 of a single processor clock cycle, when control signal 410 indicates a WR mode, a non-overlapping write signal 418 becomes active for a duration of 902 as shown in FIG. 9. During this time, the write operation, triggered by write signal 418, completes writing incoming data 412 into data storage unit 404. After the completion of its write operation, data storage unit 404 issues a complete signal 422 to timing generation unit 402. At this point, write signal 418's clock edge falls and triggers a subsequent non-overlapping read signal 420. After some delay of 912 in duration, read signal 420 is transmitted to data storage unit 404 to trigger its corresponding read operation. Similar to write signal 418, read signal 420 remains active until the read operation is completed. Additionally, it also remains active for a duration of 906 in duration to satisfy any minimum setup time requirement of a subsequent logic stage. As a result, the subsequent logic stage can immediately make use of the remaining time, duration 908, to execute any needed operations.

Similar principles apply when control signal 410 indicates a RW mode, instead of having a non-overlapping write signal 418 remain active for a duration of 902, a non-overlapping read signal 420 stays active during that time. Non-overlapping write signal 418 is triggered by read signal 420's falling clock edge, and it remains active for a duration of 904.

As has been demonstrated, the present invention supports both a read operation and a write operation within one processor clock cycle. Moreover, since the operations are non-overlapping, the read operation can read from one entry in data storage unit 404, and the write operation can write into the same entry. Using FIG. 8a as an illustration, the read operation can read data from entry 1 first, and the write operation then write into entry 1 in the same processor clock cycle.

Thus, a method and apparatus for expediting the processing of a plurality of instructions in a processor has been disclosed. Although the present invention has been described particularly with reference to the figures, it will be apparent to one of the ordinary skill in the art that the present invention may appear in any number of systems with processors which provide pipelining functionality. It is further contemplated that many changes and modifications may be made by one of ordinary skill in the art without departing from the spirit and scope of the present invention.

What is claimed is:

1. A method for expediting the processing of a plurality of instructions in a processor, the method comprising:
   a. providing a plurality of pipeline units to process said plurality of instructions, wherein each of said plurality of pipeline units has a plurality of pipe stages; and
   b. providing a decoupling queue to decouple at least one of said pipe stages from another, wherein said decoupling queue generates non-overlapping read and write signals to support corresponding read and write operations within a single clock cycle of said processor.

2. The method according to claim 1, wherein said decouplig queue in (b) further comprises:
   a control logic unit;
   a timing generation unit; and
   a data storage unit.

3. The method according to claim 2, wherein said timing generation unit generates said non-overlapping write signal for triggering said write operation within said single clock cycle;
   generates said non-overlapping read signal for triggering said read operation within said same single clock cycle; and
   ensures said write and read signals remain active for a minimum duration to complete said corresponding write and read operations and satisfy a subsequent logic stage's setup time requirement.

4. The method according to claim 1, wherein a sequence of performing said write and read operations is interchangeable.

5. The method according to claim 1, wherein said write and read operations can be performed on a same entry of said data storage unit.

6. The method according to claim 4, wherein said control logic unit determines said sequence of said write and read operations; and
   instructs said timing generation unit to generate said write and read signals according to said sequence.

7. The method according to claim 3, wherein said timing generation unit generates a first signal, either said write signal or said read signal and a second signal, either said write signal or said read signal wherein
   said first signal is triggered by a rising edge of a clock signal of said processor; and
   said second signal is triggered by a falling edge of said first signal.

8. The method according to claim 2, wherein said single clock cycle of said processor is small; and
   said data storage unit has a small number of data entries, but each of said data entries can store large data values.

9. The method according to claim 2, wherein said data storage unit is a registry file.

10. A processor comprising:
    a plurality of pipeline units for processing a plurality of instructions, wherein each of said plurality of pipeline units has a plurality of pipe stages; and
    a decoupling queue for decoupling at least one of said pipe stages from another, wherein said decoupling queue generates non-overlapping read and write signals to support corresponding read and write operations within a single clock cycle of said processor.

11. The processor according to claim 10, wherein said decoupling queue further comprises:

a control logic unit;

a timing generation unit; and a data storage unit.

12. The processor according to claim 11, wherein said timing generation unit generates said non-overlapping write signal for triggering said write operation within said single clock cycle;

generates said non-overlapping read signal for triggering said read operation within said same single clock cycle; and ensures said write and read signals remain active for a minimum duration to complete said corresponding write and read operations and satisfy a subsequent logic stage's setup time requirement.

13. The processor according to claim 10, wherein a sequence of performing said write and read operations is interchangeable.

14. The processor according to claim 10, wherein said write and read operations can be performed on a same entry of said data storage unit.

15. The processor according to claim 13, wherein said control logic unit determines said sequence of said write and read operations; and instructs said timing generation unit to generate said write and read signals according to said sequence.

16. The processor according to claim 12, wherein said timing generation unit generates a first signal, either said write signal or said read signal and a second signal, either said write signal or said read signal wherein said first signal is triggered by a rising edge of a clock signal of said processor; and said second signal is triggered by a falling edge of said first signal.

17. The processor according to claim 11, wherein said single clock cycle of said processor is small; and said data storage unit has a small number of data entries, but each of said data entries can store large data values.

18. The processor according to claim 11, wherein said data storage unit is a register file.

19. A computer system comprising:

a processor including, a plurality of pipeline units for processing a plurality of instructions, wherein each of said plurality of pipeline units has a plurality of pipe stages; and a decoupling queue for decoupling at least one of said pipe stages from another, wherein said decoupling queue generates non-overlapping read and write signals to support corresponding read and write operations within a single clock cycle of said processor; and a bus element, coupled to a storage device and said processor, wherein said storage device contains an operating system.

20. The computer system according to claim 19, wherein said processor includes said decoupling queue which further comprises:

a control logic unit;

a timing generation unit; and a data storage unit.

21. The computer system according to claim 20, wherein said decoupling queue includes said timing generation unit which generates said non-overlapping write signal for triggering said write operation within said single clock cycle;

generates said non-overlapping read signal for triggering said read operation within said same single clock cycle; and ensures said write and read signals remain active for a minimum duration to complete said corresponding write and read operations and satisfy a subsequent logic stage's setup time requirement.

22. The computer system according to claim 21, wherein said decoupling queue can perform a sequence of said write and read operations interchangeably.

23. The computer system according to claim 19, wherein said write and read operations can perform on a same entry of said data storage unit.

24. The computer system according to claim 22, wherein said decoupling queue includes said control logic unit which determines said sequence of said write and read operations; and instructs said timing generation unit to generate said write and read signals according to said sequence.

25. The computer system according to claim 24, wherein said decoupling queue includes said timing generation unit which generates a first signal, either said write signal or said read signal and a second signal, either said write signal or said read signal wherein said first signal is triggered by a rising edge of a clock signal of said processor; and said second signal is triggered by a falling edge of said first signal.

26. The computer system according to claim 20, wherein said single clock cycle of said processor is small; and said self-timed queue includes said data storage unit which has a small number of data entries, but each of said data entries can store large data values.

27. The computer system according to claim 20, wherein said self-timed queue includes said data storage unit which is a register file.

* * * * *